(12) United States Patent
Matzelle

(10) Patent No.: US 11,314,223 B2
(45) Date of Patent: Apr. 26, 2022

(54) WORK TOOL DATA SYSTEM AND METHOD THEREOF

(71) Applicant: Caterpillar Inc., Peoria, IL (US)

(72) Inventor: Richard A. Matzelle, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 187 days.

(21) Appl. No.: 16/670,783

(22) Filed: Oct. 31, 2019

(65) Prior Publication Data

US 2021/0132577 A1    May 6, 2021

(51) Int. Cl.
*G05B 19/4063*      (2006.01)
*G01M 99/00*      (2011.01)
*H04Q 9/02*      (2006.01)

(52) U.S. Cl.
CPC ....... *G05B 19/4063* (2013.01); *G01M 99/005* (2013.01); *H04Q 9/02* (2013.01); *H04Q 2209/10* (2013.01); *H04Q 2209/40* (2013.01); *H04Q 2209/826* (2013.01)

(58) Field of Classification Search
CPC ... G05B 19/4063; G01M 99/005; H04Q 9/00; H04Q 9/02; H04Q 2209/00; H04Q 2209/10; H04Q 2209/40; H04Q 2209/43; H04Q 2209/80; H04Q 2209/82; H04Q 2209/826; H04Q 2209/88
See application file for complete search history.

(56) References Cited

U.S. PATENT DOCUMENTS

| | | | |
|---|---|---|---|
| 6,834,211 B1 | 12/2004 | Coss, Jr. et al. | |
| 6,845,340 B2 | 1/2005 | Edie et al. | |
| 9,467,862 B2 | 10/2016 | Zeiler et al. | |
| 9,938,693 B1 | 4/2018 | Reed et al. | |
| 2008/0059339 A1* | 3/2008 | Gualandri | G06Q 10/06 705/28 |
| 2009/0198409 A1* | 8/2009 | Rector | G07C 5/085 701/33.4 |
| 2014/0078868 A1 | 3/2014 | McCaskill, III | |
| 2016/0116906 A1 | 4/2016 | Grivetti | |
| 2019/0112792 A1* | 4/2019 | Reed | H04W 4/80 |

(Continued)

FOREIGN PATENT DOCUMENTS

| | | |
|---|---|---|
| DE | 102014013969 A1 | 3/2016 |
| GB | 2564041 A | 1/2019 |
| JP | 2001323516 | 11/2001 |

(Continued)

*Primary Examiner* — Franklin D Balseca
(74) *Attorney, Agent, or Firm* — Leydig, Voit & Mayer, Ltd.

(57) ABSTRACT

A data system for tracking use of a work tool attachment that may be interchangeably attached to a machine includes a data transmission device located on the work tool attachment and an electronic machine controller that may be located on the machine. When an event occurs with respect to the work tool attachment, the data system collects a first tool data set from the data transmission device and a first set of machine data associated with the machine. When another event occurs with respect to the work tool attachment, the data system collects a second tool data set from the data transmission device and a second set of machine data. The first and second tool data sets and the first and second sets of machine data may be entered in one or more data logs for analytics.

20 Claims, 3 Drawing Sheets

(56) References Cited

U.S. PATENT DOCUMENTS

2019/0127957 A1   5/2019   Endo

FOREIGN PATENT DOCUMENTS

| JP | 2005-199369 A | 7/2005 |
| JP | 2016008416 | 1/2016 |
| KR | 20180135788 | 12/2018 |
| WO | 2017/142536 A1 | 8/2017 |

* cited by examiner

WORK TOOL DATA SYSTEM AND METHOD THEREOF

TECHNICAL FIELD

This patent disclosure relates generally to machine work tools and, more particularly to a system and method for monitoring usage of a work tool by a machine.

BACKGROUND

Work machines, such as loaders, excavators, and the like, typically can be used with a number of interchangeable work tools or attachments that may be releaseably coupled with the work machine to perform a particular work function. Examples of interchangeable work tools include buckets, blades, forks, grapplers, shears, cutters, and the like. The work tools or attachments are usually controlled through an implement control system such as a hydraulic or electrical system associated with the machine to actuate and control implement lift, tilt, rotation, or other maneuvering operations for the work tool to perform its function. It is desirable to monitor usage of the work tool over time, for example, to determine when repair and/or replacement of the work tool may be needed or to measure efficiency of tool use.

U.S. Patent Publication No. 2009/0198409, ("the '409 publication") assigned to the current applicant, describes a computerized data system and method that can be used with a work tool to collect data regarding use of the tool. In particular, the '409 publication describes a data storage device that can be located on an interchangeable work tool that can be releasably coupled to a machine. The data storage device can periodically exchange information with a processing device located on the machine. Utilizing various work tool and machine operating parameters, the data storage device and the processing device can track information regarding tool usage even when the work tool is used by multiple different machines. In the disclosed example in the '409 publication, the data storage device and the processing device can be configured to display a warning event to an operator of the machine if the system determines that the work tool is being used in an improper way. The present disclosure is also directed to a computerized system and method for collecting and utilizing information regarding the use of a work tool that is releasably attachable to a machine.

SUMMARY

The disclosure describes, in one aspect, a data system for monitoring use of an interchangeable work tool attachment by a machine. The work tool attachment can include a tool coupler and a data transmission device disposed on the work tool attachment that is configured to store and transmit a first tool data set and a second tool data set at separate times. The machine can include a machine coupler to attach and detach with the tool coupler. The data system can be associated with an electronic machine controller configured to (i) retrieve a first set of machine data and a second set of machine data from separate times, (ii) to receive the first tool data set and the second tool data set from the data transmission device, (iii) generate first data log entries from the first tool data set and the first set of machine data, and (iv) generate second data log entries from the second tool data set and the second set of machine data.

In another aspect, the disclosure describes a method of recording information regarding use of an interchangeable work tool attachment by a machine. According to the method, the work tool attachment is releasably attached with a machine coupler on the machine. The method uses a first tool data set regarding the work tool attachment at the time of attachment that can be received from a data transmission device disposed on the work tool attachment and generates first data log entries from the first tool data set and from a first set of machine data associated with the machine. When the work tool attachment is detached from the machine coupler, the method obtains a second tool data set from the work tool attachment at the time of detachment using the data transmission device. The method can generate second data log entries from the second tool data set and from a second set of machine data.

In yet another aspect, the disclosure describes a non-transitory computer readable medium with computer-executable instructions stored thereon that, when executed by an electronic machine controller, causes the controller to first recognize an event type associated with a work tool attachment interchangeably attachable to the machine. The electronic machine controller then generates first data log entries of a first tool data set transmitted from a data transmission device disposed on the work tool attachment and of a first set of machine data obtained by the electronic machine controller. Upon recognizing another event type associated with the work tool attachment, the electronic machine controller generates second data log entries from a second tool data set transmitted from the data transmission device disposed on the work tool attachment and from a second set of machine data obtained by the electronic machine controller. The first data log entries and the second data log entries are stored in non-transitory data storage associated with the electronic machine controller

DETAILED DESCRIPTION

Figure 1:
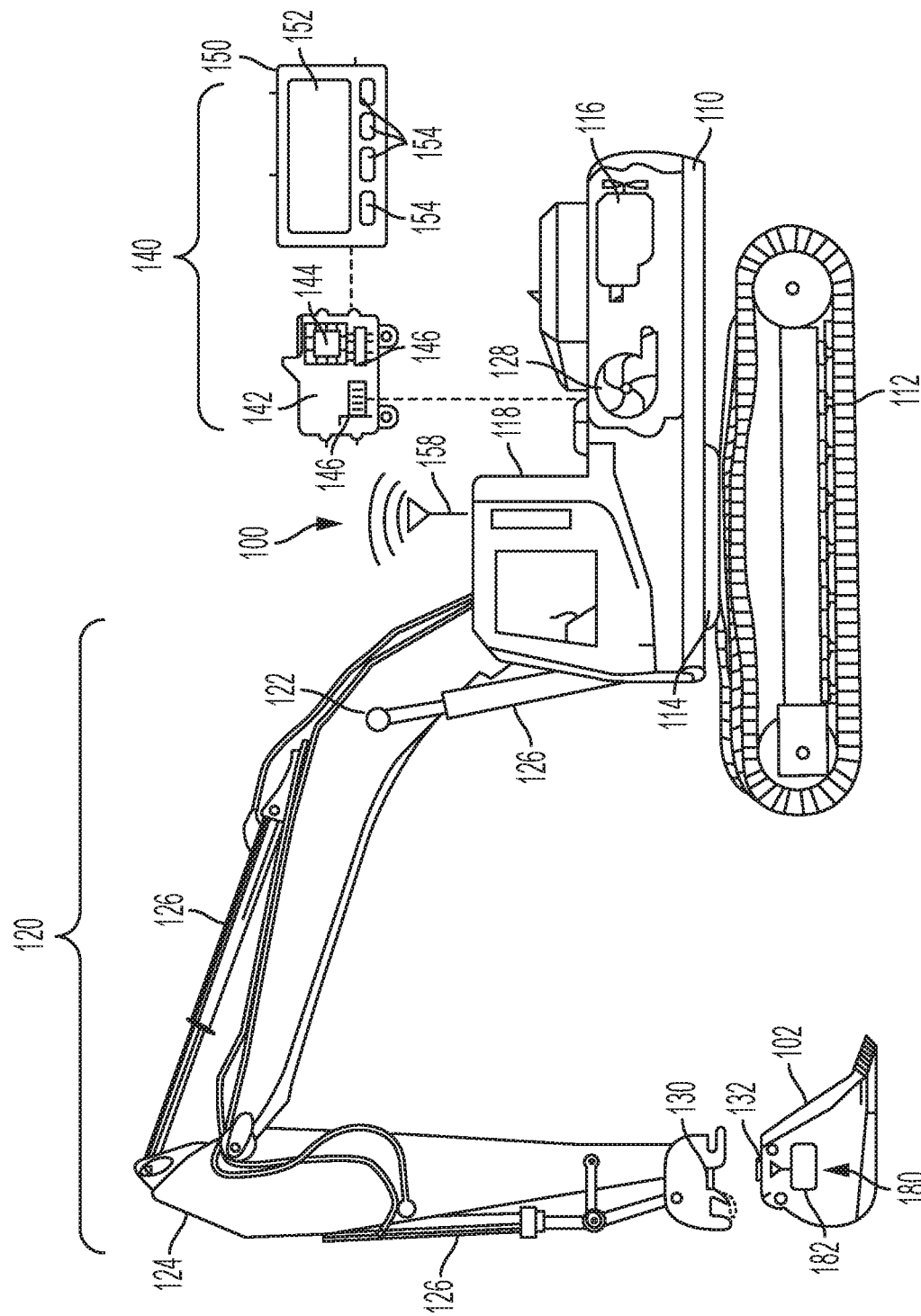
FIG. 1 is a side elevational view of a machine and an interchangeable work tool attachment that can be releaseably coupled to the machine to perform a particular task.

Reference will now be made in detail to specific embodiments or features, examples of which are illustrated in the accompanying drawings. Wherever possible, corresponding or similar reference numerals will be used throughout the disclosure and accompanying drawings to refer to the same or corresponding parts.

Referring to FIG. 1, there is illustrated an example of a work machine 100 that may be releaseably coupled to a work tool attachment 102 for performing a work-related function or task. In the illustrated example, the machine 100 may be in the form of an excavator and the work tool attachment 102 may be a bucket that the excavator can extend and maneuver, for example, to perform digging and material placement operations. However, in other examples, the machine 100 may refer to any type of machine for performing operations associated with an industry such as mining, construction, farming, transportation or other known industry. Examples of machines include wheel loaders, bulldozers, dump trucks, motor graders, material handlers and the like. Such machines may be configured for off-road or on-road operation. In addition to buckets, examples of work tool attachments 102 include blades, compactors, forked lifting devices, brushes, grapplers, cutters, shears, breakers and hammers, and the like which may be used for a variety of tasks including loading, leveling, lifting, compacting, breaking, and material maneuvering.

In the illustrated example of an excavator, the machine includes a frame 110 that may be supported on an undercarriage that includes ground engaging and propulsion devices 112 like continuous tracks or wheels for movement over the surface of a worksite. The frame 110 may include a rotatable platform 114 so that it can rotate with respect to the ground engaging and propulsion devices 112. To power the machine 100, the frame 110 may accommodate a prime mover such as an internal combustion engine 116 and other systems such as gearing and hydraulics for transmitting the power produced by the prime mover. To accommodate an operator, the frame 110 may include an operator cab or operator station 118 situated in an elevated position to provide visibility about the worksite. Situated inside the operator station 118 may be various operator controls and input devices like steering wheels or joysticks to maneuver the machine 100 and to conduct various tasks associated with the machine. To assist the operator in controlling and regulating the machine 100, the operator station 118 may also include various interfaces like dials, switches, readouts, displays and the like. However, in other embodiments, the machine 100 may be configured for autonomous, semi-autonomous, or remote operation. In autonomous operation, the machine 100 may utilize various sensors and controls to conduct operations without human interaction. In semi-autonomous operation, a human operator may conduct some of the tasks and assume some control over the machine, while the machine itself may be responsible for other operations. In remote configurations, the operator may be located away from the machine and control it indirectly through remote controls.

To connect with and maneuver the work tool attachment 102, the machine 100 can include an implement mechanism 120 that may be operatively supported by the frame 110. In the illustrated example of an excavator, the implement mechanism 120 can include a mechanical linkage with elongated and pivotally connected rigid bodies or links that can pivot and articulate with respect to each other to extend, retract, lift, lower and/or tilt the work tool attachment 102. In the example of an excavator, the links may include a boom 122 that is pivotally connected at one end to the frame 110 and pivotally connected at the other end to a stick 124 or dipper. Pivotally disposed at the end of the stick 124 can be the work tool attachment 102 in the form of a bucket. To cause the boom 122, stick 124, and bucket 102 to articulate with respect to each other, implement mechanism 120 may be operatively associated with one or more actuators 126 such as, for example, hydraulic cylinders that can extend and retract a piston resulting in lifting, tilting and other motions. To pressurize and direct hydraulic fluid for use by the actuators 126, the machine 100 may include a hydraulic system 128 that is operatively coupled with the internal combustion engine 116. It will be appreciated, however, that other configurations of the implement mechanism 120 such as those used by dozers, wheel loaders, and other types of machines are contemplated by the disclosure. In addition, other embodiments of actuators may be used such as electrical motors and other electromagnetic devices.

To enable the machine 100 to perform a variety of tasks, or to customize the machine for a particular task, the work tool attachment 102 may be interchangeable and may be configured for releasable attachment to the implement mechanism 120. Releasable attachment of the work tool attachment 102 may be achieved by a coupling mechanism or machine coupler 130 disposed at the distal end of the implement mechanism 120. The machine coupler 130 can have any suitable configuration and structure for interlocking with a corresponding attachment point, or tool coupler 132, on the work tool attachment 102. Examples include removable pin couplers in which pins can be inserted through apertures disposed in appropriate structures on the work tool attachment 102 and implement mechanism 120, knuckle couplers or jannery couplers utilizing interconnecting claws, or any other conceivable type of coupling. In various embodiments, the machine coupler 130 and tool coupler 132 can form a pivotal joint so that the work tool attachment 102 can move with respect to the implement mechanism 120. In an embodiment, the machine and tool couplers 130, 132 can be quick couplers configured for rapid attachment and detachment of the work tool attachment 102 to the implement mechanism 120 with limited or reduced operator involvement. In some embodiments, engagement and disengagement of the machine and tool couplers 130, 132 can be actuated by or with assistance of the hydraulic system 128 associated with the machine 100.

Referring to FIG. 1, to assist in monitoring and recording information about use of the work tool attachment 102 and its operative interaction with the machine 100, the machine can be associated with a work tool data system 140 that includes an electronic control unit, control module or electronic machine controller 142 configured to process electronic signals in the form of binary bits and bytes. Although the illustrated electronic machine controller 142 is illustrated as a single discrete unit, the work tool data system 140 and its functionality may be distributed among a plurality of distinct and separate components. Moreover, although the electronic machine controller 142 is associated with the machine 100, some associated components and functionality of the work tool data system 140 may be located off board of the machine 100. However, the controller 142 is adapted for monitoring various operating parameters and to responsively regulate various variables and functions affecting operation of the machine 100 and the coupled work tool attachment 102 and thus, in an embodiment, may be onboard the machine 100. To process electronic data signals and execute instructions, the electronic machine controller 142 can include appropriate circuitry 144 like one or more microprocessors, application specific integrated circuits ("ASIC"), field programmable arrays, and the like. The electronic machine controller 142 can be configured to execute various functions, steps, routines, data maps, data tables, charts and the like. In possible embodiments, the electronic machine controller 142 may be responsible for regulating and controlling other operational aspects and functions of the machine 100.

To store the functions, routines, algorithms, data maps, data tables, data charts, and the like that can include collections of computer readable data, and to store computer executable software code providing programming instructions for execution of programs and applications and for interpretation and manipulation of data, the electronic machine controller 142 can be operatively associated with data storage 146. The data storage 146 can be in the form of memory, such as random access memory or read only memory, or can be a more permanent storage device such as a hard drive. The data storage 146 can be repetitively read from and written to, and provides for storage of data and information utilized by the electronic machine controller 142 for executing the functions and tasks of the machine 100.

To receive operational data and to send control commands, the electronic machine controller 142 can include an input/output interface 148 that can communicate with various sensors and controls disposed about the machine 100 and that are operatively associated with the work tool data system 140. Communication between the electronic machine controller 142 and the other components associated with the work tool data system 140 can be established by sending and receiving digital or analog signals across communication channels such as communication lines or communication busses. For example, as will be familiar to those of skill in the art, a controller area network ("CAN") can be utilized that is a standardized communication bus including physical communication channels conducting signals conveying information between the electronic machine controller 142 and the sensors and actuators disposed about the machine 100. However, in other embodiments, the work tool data system 140 may utilize other or additional forms of data communication such as radio frequency waves like Wi-Fi, optical wave guides and fiber optics, or other technologies. The various communication channels are indicated in dashed lines for illustration purposes.

To interact with an operator, the work tool data system 140 may be operatively associated with an operator interface 150, also referred to as a human-machine interface ("HMI"). The operator interface 150 can be an output device to visually or otherwise present information to and receive instructions from a human operator regarding operation and regulation of the machine 100 by the electronic machine controller 142. In the embodiments of the machine 100 configured for onboard operation, the operator interface 150 can be located in the operator station 118 while in the embodiments configured for remote operation, the operator interface may be located remotely. The operator interface 150 can be a liquid crystal display ("LCD") capable of presenting numerical values, text descriptors, graphs, charts and the like regarding operation. In other embodiments, other visual displays may be used such as a cathode ray tube. The operator interface 150 may include or have the capabilities of a touchscreen 152 to receive input from a human operator to direct instructions or requests to the electronic machine controller 142. In particular, touchscreens 152 may present textual or visual information as images or text that the operator may touch to select some desired input. The operator interface 150 may also include tactile inputs 154 like buttons, switches, keypads and the like for interacting with the operator. In other embodiments, other interface devices may be included such as dials, knobs, keyboards, mice, printers, etc. with the work tool data system 140. Other types of visual and/or audible alarms may be also be included with the operator interface 150. As explained more fully below, the electronic machine controller 142 can be in electronic communication with a machine transmitter/receive 158 such as a radio frequency antenna for establishing radio frequency communications with other devices.

Figure 2:
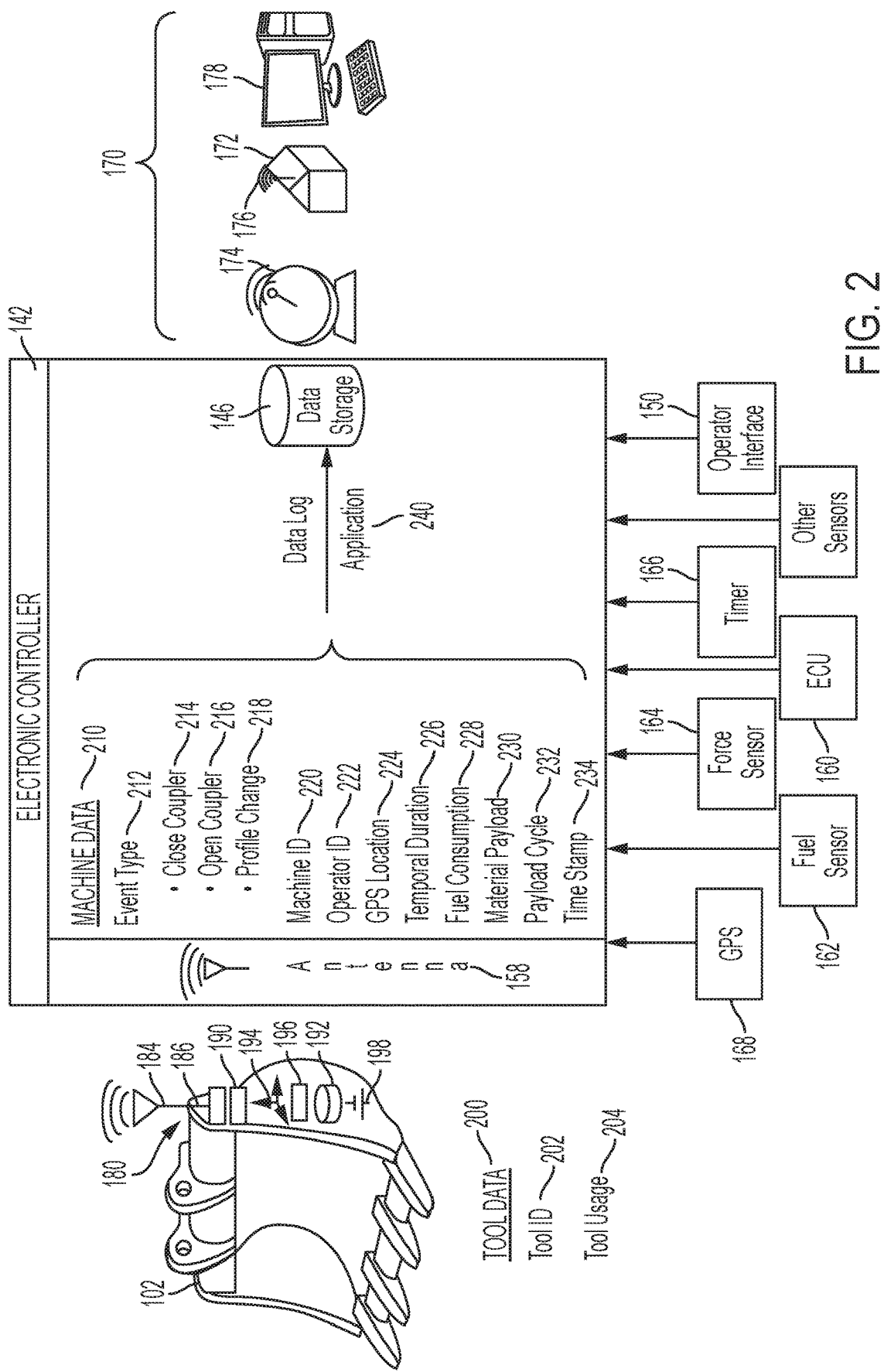
FIG. 2 is a schematic block diagram of a computerized work tool data system and associated functionality for monitoring and collecting data regarding use of the work tool attachment by the machine that includes a data transmission device on the work tool attachment configured to communicate with an electronic machine controller that may be located onboard the machine.

Referring to FIG. 2, to gather data regarding operation of the machine 100, the work tool data system 140 and/or electronic machine controller 142 can be operatively associated with one or more sensors and/or controls that are in electronic communication with the electronic machine controller 142. For example, referring to FIG. 2, to monitor and regulate operation of the prime mover such as an internal combustion engine, an engine control unit 160, also referred to as an engine control module, can be included. As may be familiar to those of skill in the art, an engine control unit 160 may regulate engine operating parameters like idle speed, air-fuel ratios, variable valve timing and the like. The electronic machine controller 142 may also be associated with a fuel sensor 162 that can measure the quantity of fuel consumed by the machine 100 during operation, for example, in terms of fuel consumption rate. The electronic machine controller 142 may also be associated with one or more force sensors 164 (e.g., strain gauges, piezoelectric devices, potentiometers, fluid pressure sensors, etc.) configured to measure forces or torque applied to the implement mechanism 120, the actuators 126, and the work tool 102 to measure material loads or work cycles conducted by the machine 100. To track time, the work tool data system 140 may include a timer 166 that can measure time intervals in any appropriate units like hours, minutes, and second. To determine the geographic location of the machine 100, the electronic machine controller 142 can be associated with satellite navigation systems such as a GPS receiver 168. The electronic machine controller 142 may be operatively associated with other sensors and controls as needed for regulating and direction operation of the machine 100.

Referring to FIG. 2, the work tool data system 140 can be operatively associated with a telematics system 170 to communicate with an external or remote location 172 to send and receive operational and/or status information. Telematics communication can be established by wireless protocols such as WiFi or cellular communications to send and receive information in the form of radio signals between a transmitter/receiver 174 located on the machine 100 and a transmitter/receiver 176 at the remote location 172. The remote location 172 may be associated with a remote computer system 178 that can provide additional processing capabilities for operation of the machine. In various embodiments, the remove computer system 178 can be used for remote or semi-autonomous operation of the machine.

Referring to FIGS. 1 and 2, and in accordance with an aspect of the disclosure, to monitor and collect data regarding the work tool attachment 102, a data transmission device 180 may be associated with the work tool attachment and operatively interacts with the work tool data system 140 associated with the machine 100. In an embodiment, the data transmission device 180 may be physically installed and located on the interchangeable work tool attachment 102 so that it will remain associated with the work tool attachment as it is changed and relocated between various machines 100. As illustrated in FIG. 1, the data transmission device 180 can be configured as a compact structure the components of which may be disposed in a plastic housing 182 that can mounted to a suitable location on the work tool attachment 102 to avoid damage or interference with operation of the work tool attachment. Mounting of the data transmission device 180 can be achieved by fasteners such as bolts, adhesives, welding, or other suitable mounting techniques. Referring to FIG. 2, to wirelessly transmit and/or receive data signals in the form of radio waves, the data transmission device 180 can include a transmitter 184 such as a radio wave antenna and associated wireless transmission circuitry 186 that can encode data signals as radio waves for transmission via a network such as, for example, a cellular network, a WiFi network, or other suitable wireless communications network. In an embodiment, the transmitter 184 and the wireless transmission circuitry 186 may be configured to transmit shortwave radio signals that may be broadcasted about a 100 meters or less. In such an embodiment, the wireless transmission circuitry 186 may be a Bluetooth circuit. In other embodiments, data communication with the data transmission device 180 can be achieved by other technologies such as, for example, infra-red signaling or electromagnetic induction. In addition to wireless data communication, aspects of the disclosure may applicable to embodiments wherein the data transmission device 180 can transmit data over physical communication channels like cables, jacks, male and female connectors, etc.

The data transmission device 180 may include additional components for functionality. For example, the data transmission device 180 can also include logic circuitry 190 that may be a microprocessor or similar integrated circuit having logic functions to control operation of the device. To store information in the form of data about the work tool attachment 102 or about the data transmission device 180, a data storage 192 can be included as part of the device that can be electronically accessed by the logic circuitry 190. The data storage 192 can be in the form of computer readable and/or writable memory. In addition, to sense movement of the work tool attachment 102, for example, when coupled to and picked up by the machine, the data transmission device 180 can include a motion detector 194 such as an accelerometer that can measure acceleration forces. Any change in the current state or spatial reference experienced by the work tool attachment 102 is interpreted by the accelerometer as movement. Other examples of motion detectors 194 include a gyroscope and a barometer. The motion detector 194 can be operatively associated with a timer or counter 196 for measuring time intervals between two trigging events. The counter 196 can measure time in units such as seconds and minutes, or may measure time in random identical intervals. To provide power for the data transmission device 180, a battery 198 or similar power cell can be included that may or may not be rechargeable. The data transmission device 180 may actively or passively transmit data with other devices.

The data transmission device 180 can be programed with and collect work tool data 200 regarding the work tool attachment 102 that the work tool data system 140 associated with the machine 100 can process and utilize for work progress assessment, performance evaluation and system monitoring. For example, the data transmission device 180 can be programmed with or include information regarding the identity of the work tool attachment 102 to which it is associated. The work tool identification data 202 can be realized by any suitable process. For example, at the time the data transmission device 180 is mounted to the respective work tool attachment 102, information specific to the work tool attachment may be stored as computer readable data in the data storage 192 of the work tool attachment. Such information may include type or make of the work tool attachment, serial number, year of manufacture and manufacturer, and the like. In addition to work tool identification data 202, other information that may be stored on the data transmission device 180 may include operating parameters, settings, and limits for the work tool attachment 102. Servicing information such as date of servicing the work tool attachment 102 and services done on the work tool attachment may be included. The work tool identification data 202 can be input into the data storage 192 by directly or indirectly connecting the data transmission device 180 to an external programming device like a computer through appropriately configured connectors (e.g., jacks, pin connectors, USB ports) and uploading the information to the data storage.

In another embodiment, the work tool identification data 202 may be a serial number associated with the data transmission device 180 and stored in computer readable form in the data storage 192 that is initially independent of the work tool attachment 102. Once attached to the work tool attachment 102, the work tool data system 140 and other backend computer systems can be programmed to associate the serial number of the data transmission device 180 with the work tool attachment. Once associated, the serial number serves as indirect identification reference for the work tool attachment 102 and can be used to access the foregoing types of information about the work tool attachment.

The data transmission device 180 may also monitor and collect work tool usage data 202 regarding usage of the work tool attachment 102 in performing intended tasks, which may be measured in units of time such as hours and minutes. To obtain work tool usage data 202, the motion detector 194 and the counter 196 can cooperatively interact to recognize and record movements of the work tool attachment 102 that indicate the work tool attachment is in use. For example, when the work tool attachment 102 is coupled to and maneuvered by a machine 100, thus changing the spatial reference of the work tool attachment, the motion detector 194 will sense the implied forces indicating movement. Initial movement of the work tool attachment 102 as sensed by the motion detector 194 may also start or initiate the counter 196, which can remain active so long as the motion detector continues to sense motion. The counter 196 therefore determines the duration of use of the work tool attachment 102, which may be recorded in the data storage 192 of the data transmission device 180. The data transmission device 180 may be programmed with dwell times and delay periods to assess and judge between those movements consistent with continuous use of the work tool attachment 102 by the same machine and those indicative that the work tool attachment is no longer in operative use.

In addition to the information obtained by the data transmission device 180, the work tool data system 140 can monitor and obtain information regarding operation of the machine 100 that can be used for performance evaluation and work tool attachment monitoring. Referring to FIG. 2, the machine data 210 may be operatively associated with the machine 100 and can be collected from the sensors and controls in communication with the electronic machine controller 142 or may be preprogrammed into the electronic machine controller. The machine data 210 are generally specific to the machine 100 and its interaction with a particular interchangeable work tool attachment 102. For example, the machine data 210 may include or record information regarding an event type 212 associated with the work tool attachment 102. An example of an event type 212 may include a close coupler event 214 in which the machine coupler 130 and the tool coupler 132, which may be quick couplers as described above, are engaged to connect the work tool attachment to the implement mechanism. Another example of an event type 212 may be an open coupler event 216 that occurs when the machine coupler 130 and tool coupler 132 are disengaged to release the work tool attachment 102 from the implement mechanism 120. Another example of an event type 212 can be a work tool profile change 218. A work tool profile change 218 may occur when an operator manuals selects operating parameters and settings for the machine 100 using, for example, the operator interface 150. The operating parameters and settings may be specific to a work tool attachment 102 and therefore indicate that a new work tool attachment has been coupled to the machine 100. Work tool profile changes 218 may, for example, alter the operating speeds, limits, and forces of the implement mechanism 120 and may alter associated parameters of hydraulic, electrical, and kinematic systems that may indicate the work tool attachment 102 has been manually interchanged by the operator as opposed to interchanging through use of a quick coupler.

The work tool data system 140 may collect other machine data 210 such as, for example, machine identification 220 that can include make and type of the machine, serial number, date of manufacture and manufacturer, and the like. Because different operators may use the machine 100, the work tool data system 140 can also obtain operator identification 222 that may be entered through the operator interface 150. To determine the location of the machine 100 during its interaction with the work tool attachment 102, the work tool data system 140 can obtain GPS location 224 in suitable coordinates using the GPS receiver 168. The temporal duration 226 the machine 100 is operatively associated with a specific work tool attachment 102 may be also be recorded. Fuel consumption 228 or quantity of fuel combusted by the machine 100 during use of the work tool attachment 102 can be recorded. Material payload 230, representing the amount of material moved by the work tool attachment 102 such as a bucket, and payload cycles 232, representing the number of work or operational cycles conducted with the work tool attachment, can also be recorded by the tool data system 100. To organize and track the machine data 210, timestamps 234 or the like can be obtained from the timer 166 associated with the work tool data system 140.

The work tool data system 140 can record the work tool data 200 and the machine data 210 collected in one or more data logs using a data log application 240 which can be a computer executable software program configured to read and write data in electronically stored data log files. The data logs can be tabular or charted representations of the work tool data 200 and machine data 210 that can be processed and analyzed by a computer system to obtain insight and information about the interchangeable work tool attachment 102 and its interaction with the machine 100. The data log application 240 can periodically or continuously record or write the work tool data 200 and machine data 210 as data entries to the data logs periodically or continuously over time so that the work tool data system 140 generates a continuous log of relevant data with respect to time. The data logs can be saved in the data storage 146 associated with the electronic machine controller 142.

INDUSTRIAL APPLICABILITY

The present disclosure may be applicable to any machine or group of machines that are capable of releasably coupling with and utilizing a plurality of interchangeable work tool attachments. The disclosed work tool data system 140 can be used to collect and store data regarding use of the interchangeable work tool attachment that can be later retrieved for use by various individuals and stakeholders. For example, the data and information gathered by the work tool data system 140 can be used for work progress assessment, performance evaluation, preventative maintenance, and machine design.

Figure 3:
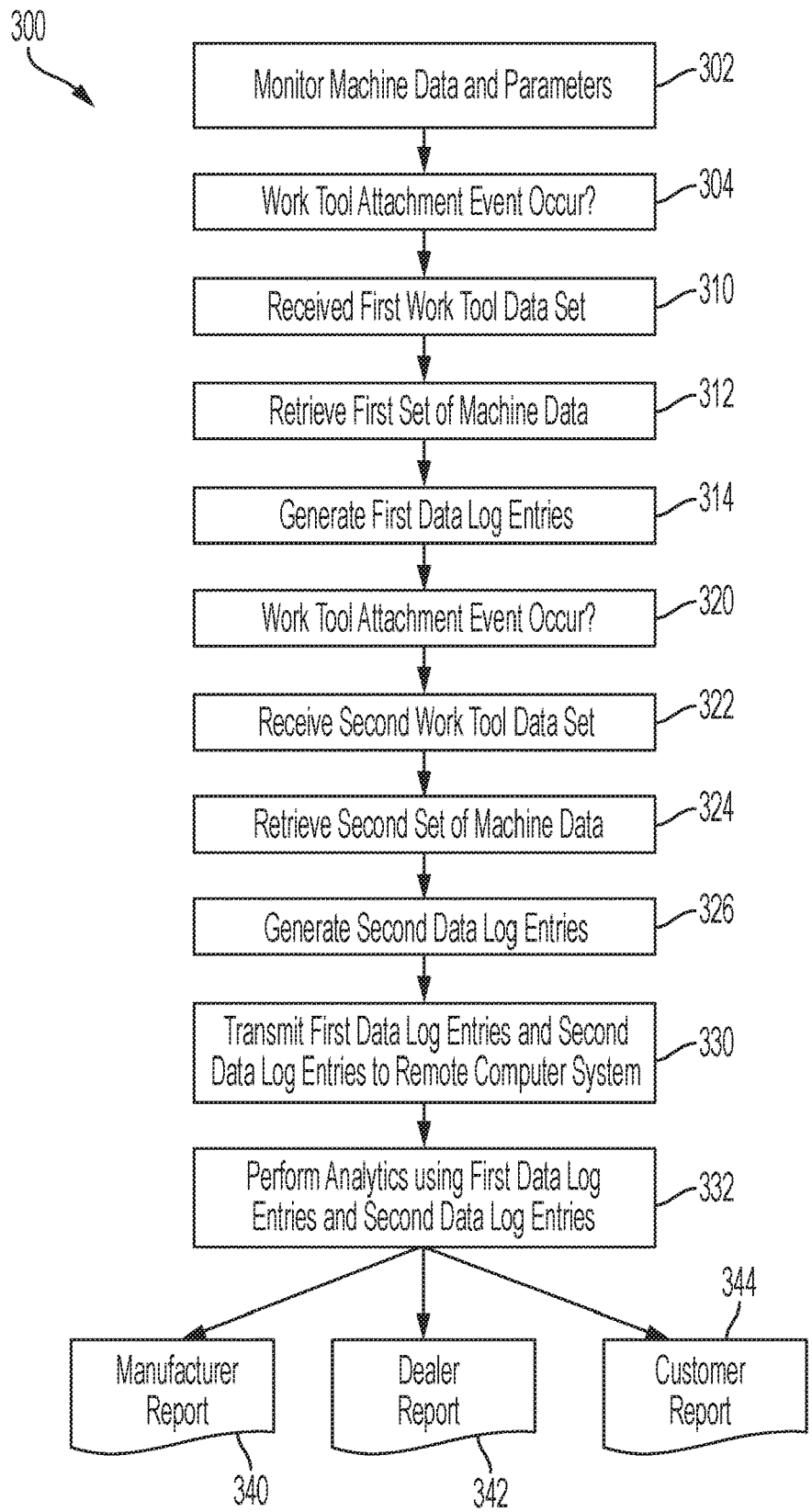
FIG. 3 is a flow diagram illustrating possible computer executable routines, processes, and/or algorithms that may be executed by the work tool data system to collect and log data with respect to the work tool attachment.

Referring to FIGS. 1-3, there is illustrated an embodiment of a computer-implemented process, application, or algorithm 300 that may be conducted by the work tool data system 140. While the algorithm 300 is disclosed as a series of steps and blocks, it will be appreciated that variations, rearrangements, deletions, and additions are contemplated by the disclosure. In a monitoring step 302, the work tool data system 140 operatively associated with a particular machine 100 may monitor machine operating data and parameters. If during the monitoring step 302 a first work tool event 304 occurs, the work tool data system 140 may perform or execute a series of queries to collect data about the work tool attachment 102, the machine 100, and their operative interaction at the time of the first work tool event 304. The first work tool event 304 may be indicative that the machine 100 has recently coupled to a work tool attachment 102 such as may be determined through a closed coupling event 214, as in the case of a quick coupler, or a profile change 218 in the case of manual coupling.

For example, the work tool data system 140 can receive a first tool data set 310 regarding the work tool attachment 102 and that can be provided by the data transmission device 180. In an embodiment, the data transmission device 180 can be configured to repeatedly or continuously transmit or broadcast work tool data 200 including tool identification data 202 and tool usage data 204 using the tool transmitter 184. Transmissions may occur in any suitable repetitive period, for example, every 100 millisecond. In the embodiments in which the data transmission device 180 is capable of short range radio communication such as Bluetooth, the machine receiver 158 disposed on the machine 100 likely receives transmissions from only or primarily the work tool attachment 102 operatively coupled to the machine. The machine receive 158 may be continuously monitoring or scanning for data transmissions from data transmission devices 180 on one or more work tool attachments.

At the occurrence of the first work tool event 304, the work tool data system 140 can also retrieve a first set of machine data 312 associated with the machine 100. Examples of the first set of machine data 312 include those disclosed with respect to FIG. 2 including event type 212, machine identification 220, operator identification 222, GPS location 224, temporal duration 226, fuel consumption 228, material payload 230, and payload cycle 232. In a first log generation step 314, the data log application 240 can record the first tool data set 310 and the first set of machine data 312 associated with the first work tool event 304 as entries in one or more data logs as described above and store the data log entries in the data storage 146 associated with the electronic machine controller 142.

The work tool data system 140 may return to the monitoring step 302 in which it continues to monitor machine operating data and parameters. If the work tool data system 140 determines that another work tool event 320 occurs, for example, an event indicative that the work tool attachment 102 and the machine 100 have been uncoupled and detached, the work tool data system 140 can perform another series of queries to collect information regarding the work tool attachment and the machine. These queries include receiving a second tool data set 322 from the data transmission device 180 including the tool identification data and the tool usage data, which may be updated to reflect the interval of time since the first work tool event 304 occurred. In particular, the motion detector 194 and the counter 196 may have recorded continuous use of the work tool attachment 102 between the first work tool event 304 and the second work tool event 320 to reflect the extent the machine 100 made use of the interchangeable work tool attachment 102. The work tool data system 140 may also retrieve a second set of machine data 324 to collect updated machine data 210.

In a second log generation step 326, the data log application 240 can generate and record second log entries reflecting the second tool data set 322 and second machine data set 324 that is also stored in the data storage 146. Additional or periodic triggering events may generate additional or periodic data log entries of work tool data and/or machine data.

At periodic intervals, the work tool data system 140 can use the telematics system 170 to conduct a data transmission step 330 to communicate the data logs containing the first and second tool data sets 310, 322 and the first and second set of machine data 312, 324 to the remote location 172 such as a back office site or the like. In a data analytics step 332, the remote computer system 178 at the remote location 172 can perform any suitable analytics on the data collected about the work tool attachment 102 and the machine 100. The remote computer system 178 may include computer analytic applications and software to compare the first and second data log entries, and possibly other data log entries from different times and/or different machines and work tool attachments.

A possible advantage of the disclosure is that the work tool data system 140 can provide information and data and generate reports and recommendations usable by different individuals and entities associated with the machine 100 and the work tool attachment 102. For example, the work tool data system 140 can generate a manufacturer report 340 or a similar disclosure of information that can be used by the manufacturer of the machine 100 and/or work tool attachment 102. For example, material payload, payload cycles, and fuel consumption can be utilized by manufacturers in identifying and designing improvements for the machine 100 and the work tool attachment 102. A dealer report 342 or similar informational disclosure can be generated recommending when repair or replacement of the work tool attachment or components thereof should occur based on tool usage data, which can be used to implement a preventative maintenance schedule. A customer report 344 or similar informational disclosure can be generated for customers or end users to assess worksite progress and/or assess machine or operator efficiencies. These and other possible advantages and features will be apparent from the foregoing disclosure.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

I claim:

1. A data system for monitoring use of a work tool attachment comprising:
   the work tool attachment including a tool coupler and a data transmission device disposed on the work tool attachment, the data transmission device configured to store and transmit a first tool data set and a second tool data set taken at separate times;
   a machine including a machine coupler configured to attach and detach with the tool coupler; and
   an electronic machine controller configured to (i) retrieve a first set of machine data and a second set of machine data at separate times, (ii) to receive the first tool data set upon occurrence of an event type associated with the work tool attachment at a first time and the second tool data set upon occurrence of another event type associated with the work tool attachment at a second time from the data transmission device, (iii) generate first data log entries from the first tool data set and the first set of machine data, and (iv) generate second data log entries from the second tool data set and the second set of machine data.

2. The data system of claim 1, wherein the first data log entries are generated when the event type associated with the work tool attachment at the first time occurs and the second data log entries are generated when the another event type associated with the work tool attachment at the second time occurs, the event type and the another event type including one or more of the machine coupler attaching to the tool coupler, the machine coupler detaching from the tool coupler, and a work tool profile change associated with the work tool attachment.

3. The data system of claim 2, wherein the first tool data set and the second tool data set include work tool identification data and work tool usage data.

4. The data system of claim 3, wherein the first set of machine data and the second set of machine data include one or more of machine identification, operator identification, duration of machine use of the work tool attachment, GPS location, fuel consumption, material payload, and payload cycles.

5. The data system of claim 4, further comprising a telematics system operatively associated with the electronic machine controller to communicate the first data log entries and the second data log entries to a remote computer system.

6. The data system of claim 5, wherein the data transmission device includes a radio frequency antenna for transmitting the first tool data set and the second tool data set via short range radio waves.

7. The data system of claim 6, wherein the data transmission device is operatively associated with a motion detector configured to sense movement of the work tool attachment.

8. The data system of claim 7, wherein the remote computer system is configured with a computer analytics application to compare the first data log entries and the second data log entries.

9. The data system of claim 8, wherein the data transmission device is operatively associated with a battery to power the radio frequency antenna and automatically transmit the first tool data set and the second tool data set.

10. The data system of claim 9, wherein a plurality of data log entries are iteratively generated upon occurrence of an event type operatively associated with the work tool attachment or with the machine.

11. The data system of claim 10, wherein the machine coupler and the tool coupler are one of a quick coupler and a manual coupler.

12. A method of recording information regarding use of a work tool attachment by a machine comprising:
- attaching the work tool attachment to a machine coupler on a machine;
- receiving a first tool data set regarding the work tool attachment at a time of attachment from a data transmission device disposed on the work tool attachment;
- generating first data log entries from the first tool data set and from a first set of machine data associated with the machine;
- detaching the work tool attachment from the machine coupler;
- receiving a second tool data set from the work tool attachment at the time of detachment from the data transmission device; and
- generating second data log entries from the second tool data set and from a second set of machine data.

13. The method of claim 12, wherein the first tool data set and the second tool data set include one or more of a tool identification data and a tool usage data.

14. The method of claim 13, wherein the first set of machine data and the second set of machine data include one or more of machine identification, operator identification, duration of machine use of the work tool attachment, GPS location, fuel consumption, material payload, and payload cycles.

15. The method of claim 14, wherein the data transmission device includes a radio frequency antenna for transmitting the first tool data set and the second tool data set via short range radio waves.

16. The method of claim 15, wherein the data transmission device is operatively associated with a motion detector configured to sense movement of the work tool attachment.

17. The method of claim 16, further comprising transmitting the first data log entries and the second data log entries to a remote computer system.

18. The method of claim 17, wherein the machine includes an electronic machine controller disposed thereon and in electronic communication with one or more parameter sensors, the electronic machine controller and the parameter sensors configured to determine the first set of machine data and the second set of machine data.

19. The method of claim 18, wherein the machine and the remote computer system are in communication via a telematics system.

20. A non-transitory computer readable medium having computer-executable instructions stored thereon that, when executed by an electronic machine controller disposed on a machine, causes the electronic machine controller to: (i) recognize an event type associated with a work tool attachment interchangeably attachable to the machine; (ii) generate first data log entries of a first tool data set transmitted from a data transmission device disposed on the work tool attachment and of a first set of machine data obtained by the electronic machine controller; (iii) recognize another event type associated with the work tool attachment; and (iv) generate second data log entries of a second tool data set transmitted from the data transmission device disposed on the work tool attachment and of a second set of machine data obtained by the electronic machine controller; wherein the first data log entries and the second data log entries are stored in non-transitory data storage operatively associated with the electronic machine controller.

\* \* \* \* \*